United States Patent [19]
Mack et al.

[11] Patent Number: 5,691,622
[45] Date of Patent: Nov. 25, 1997

[54] IDLE CURRENT CUTOFF CIRCUIT

[75] Inventors: Erika D. Mack, Duluth; José M. Fernandez, Lawrenceville, both of Ga.

[73] Assignee: Motorola, Inc., Schaumburg, Ill.

[21] Appl. No.: 578,845

[22] Filed: Dec. 26, 1995

[51] Int. Cl.$^6$ .................................................. H02J 7/00
[52] U.S. Cl. ........................ 320/29; 320/40; 320/39; 320/54
[58] Field of Search .............................. 320/29, 30, 39–40, 320/49, 54–55, 51

[56] References Cited

U.S. PATENT DOCUMENTS

| | | | |
|---|---|---|---|
| 5,304,915 | 4/1994 | Sanpei et al. | 320/40 X |
| 5,332,928 | 7/1994 | Johnson | 307/296.6 |
| 5,477,130 | 12/1995 | Hashimoto et al. | 320/29 X |
| 5,493,197 | 2/1996 | Eguchi et al. | 320/29 X |
| 5,504,411 | 4/1996 | McCaleb et al. | 320/54 X |
| 5,530,336 | 6/1996 | Eguchi et al. | 320/29 X |
| 5,547,775 | 8/1996 | Eguchi et al. | 320/40 X |
| 5,568,039 | 10/1996 | Fernandez | 320/29 |
| 5,569,550 | 10/1996 | Garrett et al. | 429/7 |
| 5,581,170 | 12/1996 | Mammano et al. | 320/40 X |
| 5,602,460 | 2/1997 | Fernandez et al. | 320/35 X |
| 5,604,415 | 2/1997 | Vashi et al. | 320/40 X |

*Primary Examiner*—Peter S. Wong
*Assistant Examiner*—K. Shin
*Attorney, Agent, or Firm*—Kenneth M. Massaroni

[57] ABSTRACT

A cutoff switch (40) separates the reference line (20) of a control circuit (18) from the B– line (24). The cutoff switch is in an electrically open state until the function of the control circuit is required, thus eliminating current flow through the control circuit when the function of the control circuit is not required. To enable the control circuit, a threshold switch (42) is provided to cause the cutoff switch to change states when the battery voltage reaches a predetermined level. To provide an override, a diode is connected between an auxiliary line (26), used a thermistor (28), for example.

15 Claims, 1 Drawing Sheet

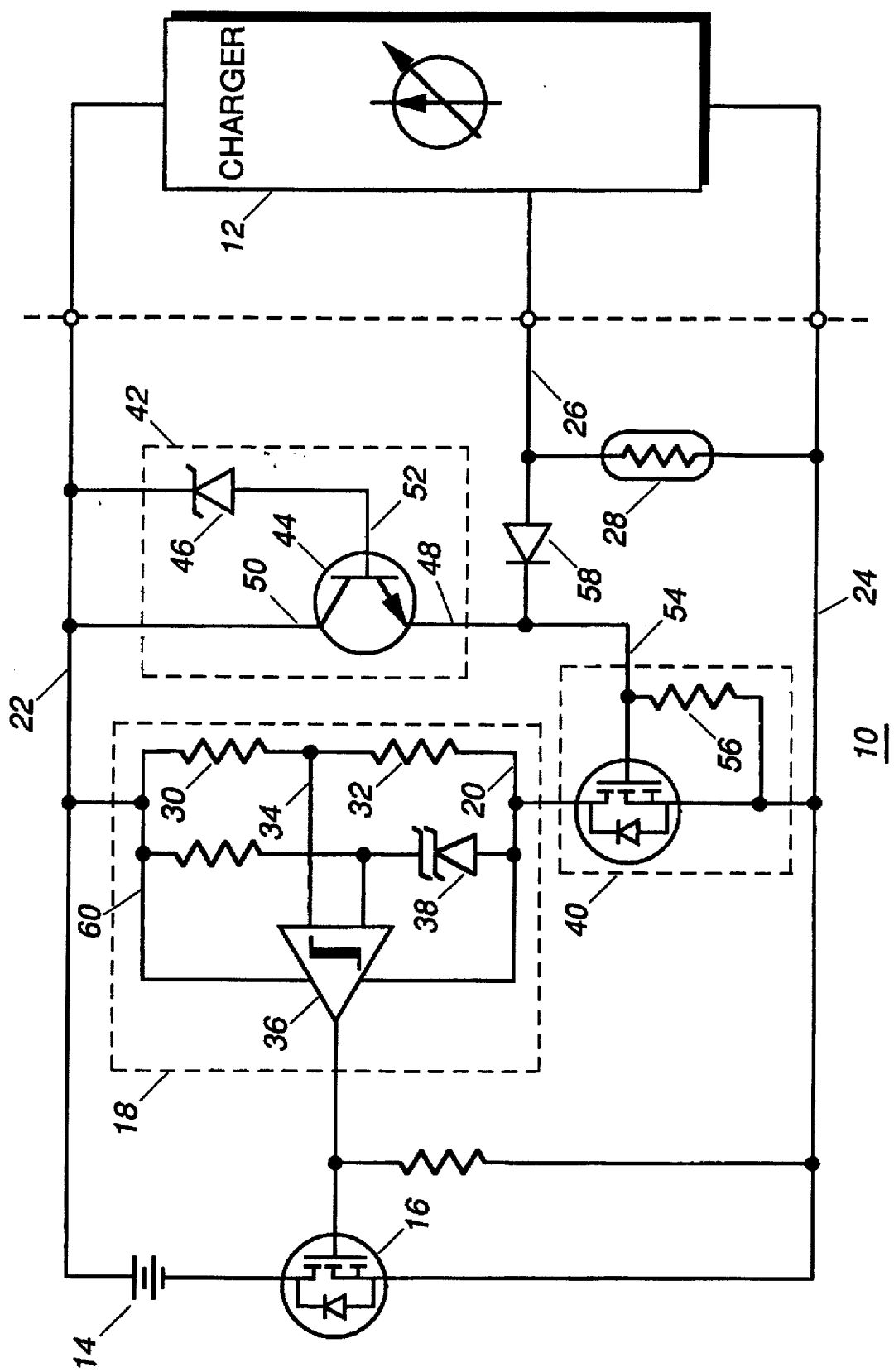

IDLE CURRENT CUTOFF CIRCUIT

TECHNICAL FIELD

This invention relates in general to battery packs, and more particularly to battery packs having electronic circuitry.

BACKGROUND

An increasing number of portable electrical devices are powered by batteries or battery packs having electronic circuitry. Battery circuitry is employed for a variety of reasons such as charge measurement, more commonly referred to as fuel gauging, and conditioning, for example. Another type of battery circuits that are becoming more prevalent are compatibility circuits. These circuits allow batteries to be charged by chargers not designed for such batteries. In general, this is said to be an incompatible charger.

Recently, batteries referred to as lithium ion (li-ion)have been made commercially available in small rechargeable cells for use in portable applications. Li-ion offers improved performance over conventional systems such as Nickel-Cadmium (NiCd) and Nickel-Metal Hydride (NiMH). It has superior volumetric energy density, meaning that, for the same weight, li-ion based battery packs will provide much longer operation time for a given device. Conversely, a li-ion based battery pack offering similar operation time as a NiCd battery pack will be much lighter and smaller. In certain markets, cellular telephones in particular, light weight is a critical marketing aspect.

However, the charge regimes of li-ion and the nickel systems are incompatible. Thus, if li-ion batteries are to be sold in markets where nickel systems are the convention, and since nickel system chargers do not provide the appropriate li-ion charge regime, li-ion systems sold into those markets must account for the discrepancy. Either the li-ion batteries must lock out nickel system chargers and be used exclusively with a new charger, or they must have retrofit, or compatibility circuits so that they can take advantage of nickel system chargers.

To make a li-ion battery that can be charged in a nickel system charger, the battery must have an over-voltage cutoff circuit. Since li-ion suffers severe performance degradation if charged to an excessive voltage, and nickel system chargers are typically not voltage limited, a li-ion battery must have some means of protection. Typically this is accomplished by coupling a switch, such as a MOSFET, in series with the li-ion cells, and having a control circuit that monitors battery voltage and opens the switch when a predetermined voltage level is reached. In addition, li-ion batteries usually comprise under-voltage cutoff circuitry, balancing circuitry, and sometimes redundant circuitry.

All of this circuitry draws current from the battery, and tends to decrease it's effective energy delivery potential. The charged drained from the battery could otherwise be used for the device, and since most of the circuitry is idle until some event happens, such as reaching an over-voltage level, it is inefficient. Therefore there exists a need for a means whereby the current drain of certain battery circuits can be eliminated during idle times, and have the circuit become active only when it is required.

BRIEF DESCRIPTION OF THE DRAWING

The FIGURE is a schematic diagram of a battery pack having an idle current cutoff circuit in accordance with the invention.

DETAILED DESCRIPTION OF THE PREFERRED EMBODIMENT

While the specification concludes with claims defining the features of the invention that are regarded as novel, it is believed that the invention will be better understood from a consideration of the following description in conjunction with the drawing figures, in which like reference numerals are carried forward.

Referring now to the figure, there is illustrated therein a schematic circuit diagram of a battery pack 10 connected to a charger 12. The two are separated by a vertical dashed line at their electrical interface. The battery pack comprises at least one battery cell 14, which may be at least one lithium ion battery cell. Coupled in series with the battery cell or cells is an over-voltage switch 16 which is controlled by an over-voltage control circuit 18 having a reference line 20. The battery pack has a B+ line 22 and a B− line 24, and typically an auxiliary line 26 for an auxiliary device such as a thermistor 28 for sensing battery temperature. The B+ and B− lines allow the battery cells to provide power to device, and allow a charger to recharge the battery pack. The auxiliary line will have an auxiliary voltage applied to it by the charger. To this point what has been described is a prior art battery pack, except, unlike the circuit shown here, a prior art battery pack will have the reference line 20 of the over-voltage control circuit coupled directly to the B− line.

The over-voltage control circuit 18 senses bakery voltage between the B+ and B− lines by a resistor divider comprised of first divider resistor 30 and second divider resistor 32. The battery voltage is reduced to a proportional voltage on line 34, which is fed to a first input of a comparator 36, such as an LM2904, which is manufactured by number of companies. The comparator compares the voltage on line 34 with a reference voltage provided by, for example, a reference diode 38, such as an LM4040, manufactured by National Semiconductor. The first and second divider resistors are selected so that the voltage on line 34 is equal to the reference voltage when the battery voltage between the B+ and B− lines reaches the predetermined over-voltage limit or level. When that occurs, the output of the comparator, which is connected to the switch, transistions from a high voltage to a low voltage, causing the switch to electrically open, or become such a high resistance as to appear open. This type of circuit is relatively common, and it will be appreciated by those skilled in the art that when the reference line 20 is directly connected to the B− line, the over-voltage control circuit will constantly draw current.

To eliminate this current drain when the over-voltage circuitry is not necessary, that is, when the battery voltage is below the over-voltage level, the invention separates the reference line of the over-voltage control circuit from the B− line. The battery pack 10 comprises an idle current cutoff circuit comprising a cutoff switch 40, which is used to connect and disconnect the two lines according to the invention. It is preferred that the cutoff switch is an N-channel MOSFET for ease of control. In general, while the battery voltage is below the over-voltage limit, the cutoff switch is open, or in a high resistance state so as to block current from flowing through the over-voltage control circuit. When the battery voltage reaches a predetermined level slightly below the over-voltage level, the switch changes states to provide a virtual short circuit between the reference line and the B− line, thus enabling the over-voltage control circuit. While the over-voltage control circuit is disabled, the output of the comparator will rise to a level such that the over-voltage switch will be closed, or in a very low resistance state, to eliminate any voltage drop across the over-voltage switch upon discharging the battery that would otherwise be present.

To properly control the cutoff switch a threshold switch 42 is required. In general, the threshold switch is sensitive to battery voltage, and provides a signal to the cutoff switch when the battery voltage has risen to the predetermined level below the over-voltage level. The preferred circuit for implementing the threshold switch comprises a bi-polar transistor 44 and a zener diode 46. The bi-polar transistor shown here is an NPN type, and has a collector 48, emitter 50, and base 52. The collector is connected to the B+ line, the emitter to the input 54 of the cutoff switch, and the zener diode is connected between the B+ line and the base. The zener voltage of the zener diode controls the circuit and should be selected accordingly.

To appreciate how the invention functions, assume first that the battery voltage is below the predetermined level below the over-voltage threshold. It has been described that under such conditions the cutoff switch should be open. To ensure that no residual charge interferes with the operation of the cutoff switch, a pull down resistor 56 may be connected between the input of the cutoff switch and the B– line. The zener diode is selected so that it does not conduct until the battery voltage reaches the predetermined level.

For example, if the over-voltage limit is 8.2 volts (all voltage levels discussed herein are with reference to the B– line), then the predetermined level may be 7.9 volts. Assume that the cutoff switch will change from open to closed when 1 volt is applied to the input 54. This is referred to as the threshold voltage of the switch. To achieve this threshold voltage, the bi-polar transistor must conduct current to the input, and a voltage will appear across the pull down resistor 56. To cause the bi-polar transistor to conduct at the appropriate time, the zener diode must conduct current to the base when the battery voltage reaches the predetermined level, as previously mentioned. Therefore, to select the zener voltage of the zener diode, assuming 7.9 volts is the enabling voltage, subtract the threshold voltage of the cutoff switch, plus the Vbe voltage of the bi-polar transistor, which totals about 1.7 volts, thus yielding 7.9–1.7=6.2 volts. Therefore, if the zener voltage is selected as 6.2 volts, then when the battery voltage reaches 7.9 volts, the cutoff switch will open, thus enabling the over-voltage control circuit.

To ensure that the over-voltage control circuit becomes enabled when the battery is placed in a charger, an override means may be included. The override means is connected between the auxiliary line and the input of the cutoff switch, and turns on the cutoff switch when an auxiliary voltage is present. Most chargers have connections or contacts besides B+ and B–, and include an auxiliary contact for some other function relating to charging. The most prevalent example of which is the thermistor contact commonly found on battery packs. To allow the override of the threshold switch when the battery pack is connected to a charger, the invention takes advantage of this auxiliary contact. The battery pack includes a conventional thermistor 28, to which a DC voltage and current is applied by the charger. This will be true of either a compatible or incompatible charger. The preferred override means is diode 58 connected between the auxiliary line 26 and the input 54 of the cutoff switch 40. This allows some of the auxiliary voltage applied by the charger to the auxiliary line to act on the cutoff switch, thus enabling the over-voltage switch prior to the battery voltage reaching the predetermined level. The diode is oriented so that when the threshold switch does begin conducting current, which will drive the voltage on the input 54 up much higher, it does not interfere with battery temperature measurements. In other words, the diode 58 will allow current to flow from the charger to the input 54, but will not allow current from the threshold switch to flow into the thermistor.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims. One such substitution would be to separate the power line 60 of the over-voltage control circuit from the B+ line by means of a cutoff switch instead separating the reference line 20 from the B– line. This type of substitution would simply require an artisan to replace the N-channel MOSFET with a P-channel MOSFET, and the NPN transistor with a PNP transistor connected to the B– line. The zener diode would then also be connected to the B– line. This type of substitution would be very obvious to one having ordinary skill.

What is claimed is:

1. An idle current cutoff circuit for use in a battery pack having at least one battery cell for providing a battery voltage between a B+ line and a B– line, an over-voltage switch coupled in series with said at least one battery cell, and an over-voltage control circuit, having a reference line, for controlling operation of said over-voltage switch such that it opens when said battery voltage reaches an over-voltage level, said idle current cutoff circuit comprising:

a cutoff switch, having an input, connected between said reference line of said over-voltage control circuit and said B– line;

a threshold switch connected between said input of said cutoff switch and said B+ line; and wherein said cutoff switch is off until said battery voltage reaches a predetermined level below said over-voltage level, said threshold switch causing said cutoff switch to turn on when said battery voltage reaches said predetermined level.

2. An idle current cutoff circuit as defined by claim 1, wherein said cutoff switch is a MOSFET.

3. An idle current cutoff circuit as defined by claim 1, wherein said threshold switch is comprises:

an bi-polar transistor having base, collector, and emitter, said emitter connected to said input of said cutoff switch, said collector connected to said B+ line; and a zener diode, having a zener voltage, connected between said base and said B+ line, said zener voltage selected such that it conducts when said battery voltage reaches said predetermined level.

4. An idle current cutoff circuit as defined by claim 1, wherein said battery pack further comprises an auxiliary line, said auxiliary line having an auxiliary voltage when said battery pack is connected to a charger, said idle current cutoff circuit further comprises a override means connected between said auxiliary line and said input of said cutoff switch which turns on said cutoff switch when said auxiliary voltage is present.

5. An idle current cutoff circuit as defined by claim 4, wherein said battery pack further comprises a thermistor disposed between said auxiliary line and said B– line.

6. An idle current cutoff circuit as defined by claim 4, wherein said override means comprises a diode.

7. An idle current cutoff circuit as defined by claim 1, wherein said at least one battery cell is at least one lithium ion battery cell.

8. A battery pack, comprising:
- at least one battery cell for providing a battery voltage between a B+ line and a B− line;
- an over-voltage switch coupled in series with said at least one battery cell;
- an over-voltage control circuit, having a reference line, for controlling operation of said over-voltage switch such that it opens when said battery voltage reaches an over-voltage level; and
- an idle current cutoff circuit for disconnecting said over-voltage control circuit from said B− line while said battery voltage is below a predetermined level which is below said over-voltage level.

9. An idle current cutoff circuit as defined by claim 8, wherein said at least one battery cell is at least one lithium ion battery cell.

10. A battery pack as defined by claim 8, wherein said idle current cutoff circuit comprises:
- a cutoff switch, having an input, connected between said reference line of said over-voltage control circuit and said B− line;
- a threshold switch connected between said input of said cutoff switch and said B+ line; and
- wherein said cutoff switch is off until said battery voltage reaches said predetermined level, said threshold switch causing said cutoff switch to turn on when said battery voltage reaches said predetermined level.

11. A battery pack as defined by claim 10, wherein said cutoff switch is a MOSFET.

12. A battery pack as defined by claim 10, wherein said threshold switch is comprises:
- a bi-polar transistor having base, collector, and emitter, said emitter connected to said input of said cutoff switch, said collector connected to said B+ line; and
- a zener diode, having a zener voltage, connected between said base and said B+ line, said zener voltage selected such that it conducts when said battery voltage reaches said predetermined level.

13. A battery pack as defined by claim 10, wherein said battery pack further comprises an auxiliary line, said auxiliary line having an auxiliary voltage when said battery pack is connected to a charger, said idle current cutoff circuit further comprises a override means connected between said auxiliary line and said input of said cutoff switch which turns on said cutoff switch when said auxiliary voltage is present.

14. A battery pack as defined by claim 13, wherein said battery pack further comprises a thermistor disposed between said auxiliary line and said B− line.

15. A battery pack as defined by claim 13, wherein said override means comprises a diode.

* * * * *